United States Patent
Stomski

(10) Patent No.: US 6,474,599 B1
(45) Date of Patent: Nov. 5, 2002

(54) AIRCRAFT SECURITY SYSTEM

(76) Inventor: Gerald D. Stomski, 54 Washington Rd., Woodbury, CT (US) 06798

( * ) Notice: Subject to any disclaimer, the term of this patent is extended or adjusted under 35 U.S.C. 154(b) by 0 days.

(21) Appl. No.: 09/683,297

(22) Filed: Dec. 11, 2001

(51) Int. Cl.$^7$ .............................................. B64D 11/00
(52) U.S. Cl. ..................... 244/118.5; 244/118.6; 244/129.4; 244/129.5; 109/68; 109/69; 109/70
(58) Field of Search ............... 244/118.5, 118.6, 244/129.4, 129.5; 49/103, 366, 367; 109/68

(56) References Cited

U.S. PATENT DOCUMENTS

| | | | | |
|---|---|---|---|---|
| 1,008,125 A | | 11/1911 | Eichelkraut | |
| 3,658,277 A | * | 4/1972 | Anderson | 109/8 |
| 3,680,499 A | * | 8/1972 | Boudreau | 109/32 |
| 3,704,845 A | * | 12/1972 | Ord | 244/1 R |
| 3,811,643 A | * | 5/1974 | Pizzo | 244/1 R |
| 4,112,818 A | * | 9/1978 | Garehime, Jr. | 109/9 |
| 4,481,887 A | * | 11/1984 | Urbano | 109/3 |
| 4,586,441 A | | 5/1986 | Zekich | |
| 4,681,286 A | * | 7/1987 | Church et al. | 244/118.5 |
| 5,031,860 A | * | 7/1991 | Ruiz et al. | 244/118.5 |
| 5,577,358 A | * | 11/1996 | Franke | 244/118.5 |
| 5,625,341 A | | 4/1997 | Giles et al. | |
| 5,694,867 A | * | 12/1997 | Diaz-Lopez | 109/6 |
| 6,158,692 A | * | 12/2000 | Abild et al. | 244/129.5 |
| 6,298,603 B1 | * | 10/2001 | Diaz | 109/3 |
| 6,308,644 B1 | * | 10/2001 | Diaz | 109/6 |

* cited by examiner

*Primary Examiner*—Charles T. Jordan
*Assistant Examiner*—Stephen A Holzen
(74) *Attorney, Agent, or Firm*—William C. Crutcher

(57) ABSTRACT

An aircraft security system comprises a transparent bullet-proof security chamber interposed between the pilot area and the passenger area, and providing the only means of passage to the pilot area. The security chamber has a cockpit door to the cockpit area and passenger door to the passenger area. The passenger door must be closed when the cockpit door is open and vice versa. A third, or entry door, may be used to facilitate boarding the aircraft. All doors are closed and locked when sensors indicate unauthorized entry of a passenger into the security chamber.

9 Claims, 6 Drawing Sheets

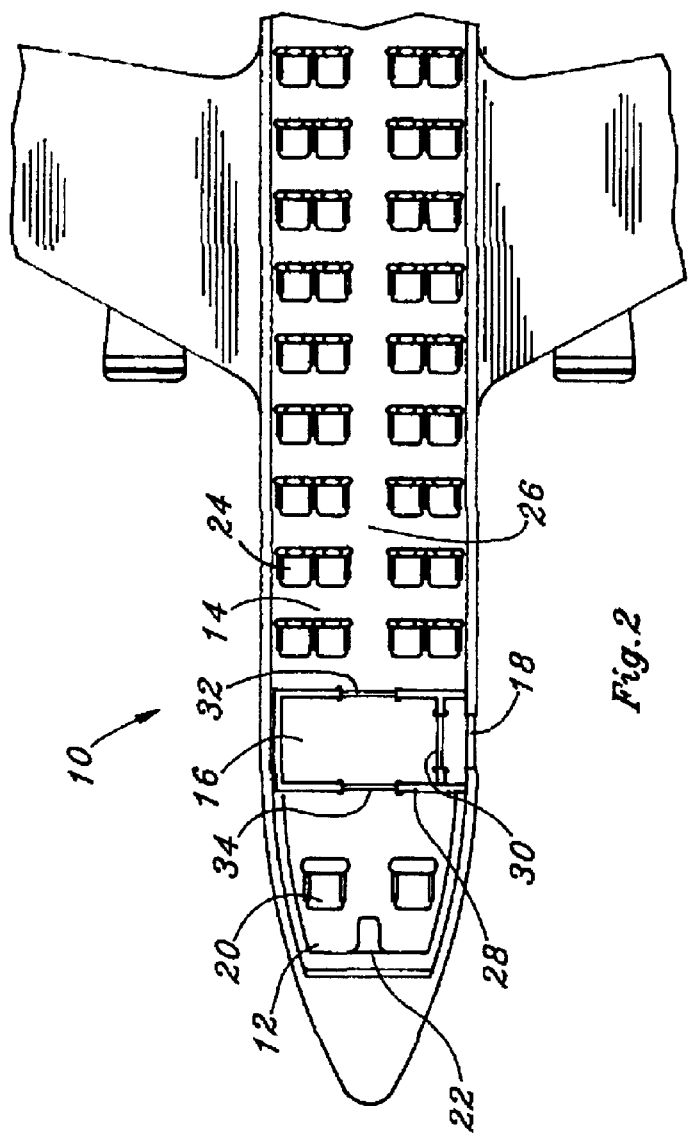
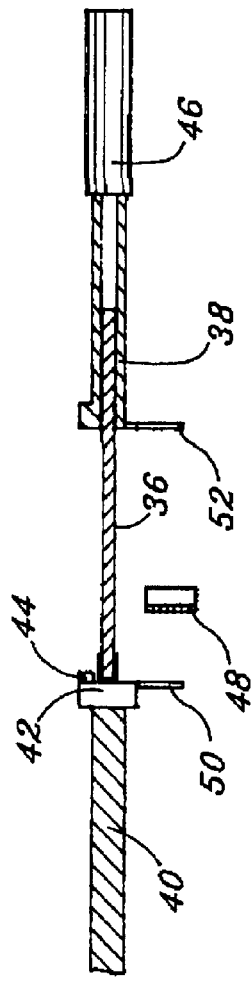
Fig. 2
Fig. 3

US 6,474,599 B1

AIRCRAFT SECURITY SYSTEM

BACKGROUND OF INVENTION

This invention relates to apparatus and method for increasing the security of an aircraft, its passengers and its flight crew and prevention of hijacking or injury during flight. More particularly, the invention relates to a security system for restricting access between the cockpit area and the passenger area during flight, while yet allowing for normal boarding and usage of aircraft facilities in flight.

It is possible for a single person or small group to obtain control over a passenger aircraft in flight by gaining access to the cockpit area. In the past, the cockpit area has been separated from the passenger area by a single breachable door. In the passenger area, flight attendants serve the needs of the passengers. Access to the cockpit area through the cockpit door is not always strictly controlled. Luring or forcing a pilot into the passenger area by a would-be skyjacker can result in takeover of the aircraft with potential serious injury or loss of life to occupants of the aircraft, along with loss of life and property on the ground.

Proposals for reinforcing the cockpit door to prevent unwanted intrusion do not prevent an assailant from gaining access to the cockpit area when the door is voluntarily opened by a pilot to investigate a disturbance or to utilize facilities in the passenger area.

Accordingly, one object of the present invention is to provide an improved apparatus and method for controlling passage of personnel between the cockpit area and the passenger area.

Another object of the invention is to provide improved apparatus and method for allowing boarding of the aircraft in an unrestricted manner, while controlling unauthorized passenger movement while in flight.

Another object of the invention is to provide an improved method and apparatus for temporarily isolating and detaining a skyjacker.

SUMMARY OF INVENTION

Briefly stated, the invention comprises a security system for monitoring and protecting flight crew in an aircraft carrying passengers, said flight crew being fitted with electronic identification tags, the aircraft having a cockpit area, a passenger area, and an outer boarding door, the security system comprising a security chamber having transparent bullet-proof walls interposed between, and providing the only passage between, the cockpit area and the passenger area, the security chamber having at least two bullet-proof doors comprising a cockpit door opening into the cockpit area and a passenger door, and an automated door interlock system arranged to prevent opening both the cockpit door and the passenger door at the same time when the outer boarding door is closed. The security chamber may have a third or entry door adjacent to outer boarding door to facilitate boarding.

Preferably, the security system includes sensors adapted to monitor passage of an unauthorized person through the passenger door and logic means responsive to the sensors and arranged to cause said automated door interlock system to close and lock all of the doors when the sensors detect passage of an unauthorized person into the security chamber, or when actuated by a flight crew member.

BRIEF DESCRIPTION OF DRAWINGS

The invention will be better understood by reference to the following description, taken in connection with the accompanying drawing, in which:

FIG. 2 is a simplified schematic plan view of the forward portion of a passenger aircraft with center aisle, FIG. 3 is a simplified schematic plan view of a door to the security chamber, with associated lock, position indicator, RFID sensor equipment, and quick closing mechanism.

DETAILED DESCRIPTION

Figure 7:
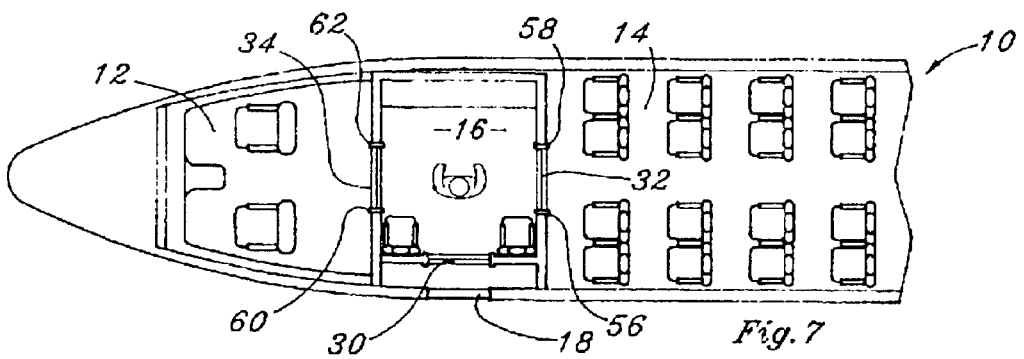
FIG. 7 is a simplified schematic partial plan view of the aircraft of FIG. 2 after unauthorized entry.

Referring now to FIG. 7 of the drawing, a passenger aircraft is shown generally at 10, having all of the conventional equipment and features, with a cockpit area 12 and a passenger area 74. Interposed between the cockpit area and the passenger area is a security chamber shown in dotted lines, designated by reference numeral 76. Security chamber 76, which is the subject of the present invention, is surrounded by bullet-proof, impact resistant walls on all sides, and is reached through a conventional outer boarding door 18.

FIG. 2 of the drawing shows a plan view of the previously referenced elements, with additional details. Cockpit are a 12 contains the pilot and co-pilot seats 20, with console 22 and other equipment used to fly and navigate the aircraft 10. Passenger area 14 contains two rows of multiple passengers eats 24 with a center aisle 26.

In accordance with the invention, the security chamber 16 is interposed between cockpit area 12 and passenger area 14 and comprises bullet-proof walls 28 and bullet-proof floor and ceiling (not shown). Access to security chamber 16 is through an entry door 30, a passenger door 32 and a pilot door 34. Doors 30, 32, 34 are also bullet-proof and may be partially or wholly constructed of transparent bullet-proof glass or plastic so that the pilot may view the passenger area or security chamber in the event of a disturbance. The security chamber may contain food service equipment, storage closets, or other equipment utilized by the flight attendants. Preferably, it does not contain any facilities, such as bathrooms, required by the passengers during flight.

Figure 8:
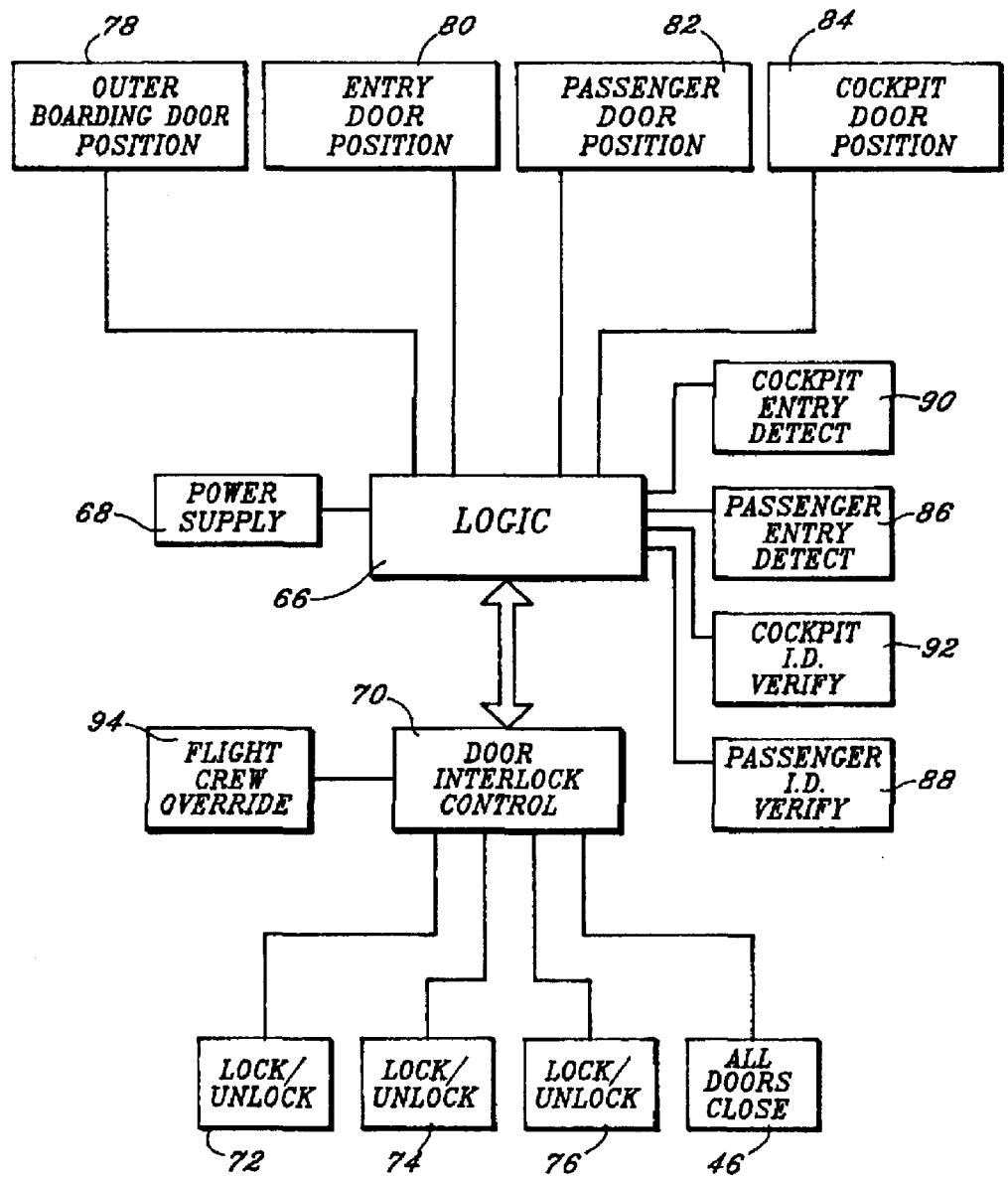
FIG. 8 is a simplified schematic block diagram of logic and/or interlock control system.

The three doors to security chamber 16 are provided with closing mechanisms and automatic electronic locks, which function in a manner to be described. Such electronic closing mechanisms and locks are conventional and are operated by a door interlock control (FIG. 8).

Reference to FIG. 3 schematically illustrates conventional and commercially available equipment for secure access control, which may be employed on the entry door 30, passenger door 32, and pilot door 34. These details are shown on a fast closing door 36 which could be used for all three doors 30, 32, 34 in FIG. 2. A bullet-proof sliding door 36 bridges the entrance between two bullet-proof wall sections 38, 40. An electronic lock 42 prevents opening the door 36 unless remotely actuated by a door interlock control. A door closed proximity sensor 44 indicates when the door is closed. Means to rapidly shut the door 36 is shown as a hydraulic cylinder 46, which is operated by the door interlock control system to be described. Other equivalent mechanisms such as spring loaded actuator, pneumatic cylinder, or similar devices may be substituted, as long as there is a positive closing force. A radio frequency identification device (RFID), or equivalent system for electronic identification of a portable tag 48 serves to verify the identity of a person carrying the tag 48 while passing between sensor panels 50, 52. Tags 48 identifying flight crew (pilots and flight attendants) are carried by members of the flight crew, and authorize persons to enter security chamber 16 during flight. Tags 48 may be incorporated into identification cards or carried inside the clothing of flight crew members. A suitable identification tag for enhanced security is disclosed in U.S. Pat. No 6,154,137 issued Nov. 28, 2000 to Goff et al. which is incorporated herein by reference. The type of identification detection tag and transmitter/receiver used by the identity verification sensors are not material to the present invention, and many commercially available security identification systems are available for this purpose. Sensor panels 50, 52 are also equipped with infra-red sensors to detect passage of a person through the opening when door 36 is open. Such entry detection sensors are conventional and well-known to those skilled in the art. Both the identification verification sensors and the entry detection sensors are collectively referred to herein as sensors.

Referring now to FIGS. 4–7, four security conditions of security chamber 16 are shown in the separate figures. Reference numbers correspond with those of FIG. 2.

Figure 4:
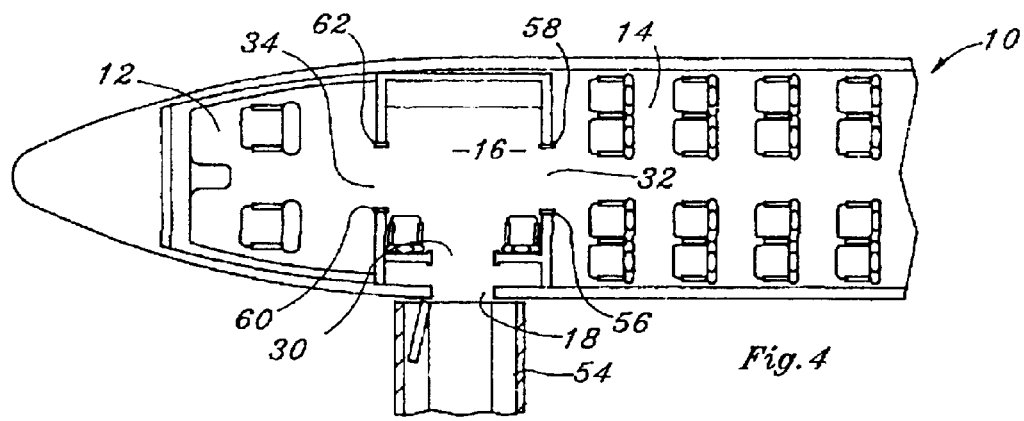
FIG. 4 is a simplified schematic partial plan view of the aircraft of FIG. 2 during boarding.

Referring first to FIG. 4, aircraft 10 is shown at the boarding gate, with an extendable companion way 54 in place against the side of the fuselage. Both of the aircraft boarding door 18 and the entry door 30 are open to admit boarding passengers. Passenger door 32 is also open to allow passengers to take their seats. Pilot door 34 is shown open but may be either open or closed. The identification verification and entry detection sensors are indicated by reference numerals 56, 58 at the passenger door 32 and similar sensors 60, 62 at the pilot door 34. Sensors 58–62 are not activated at this time.

Figure 5:
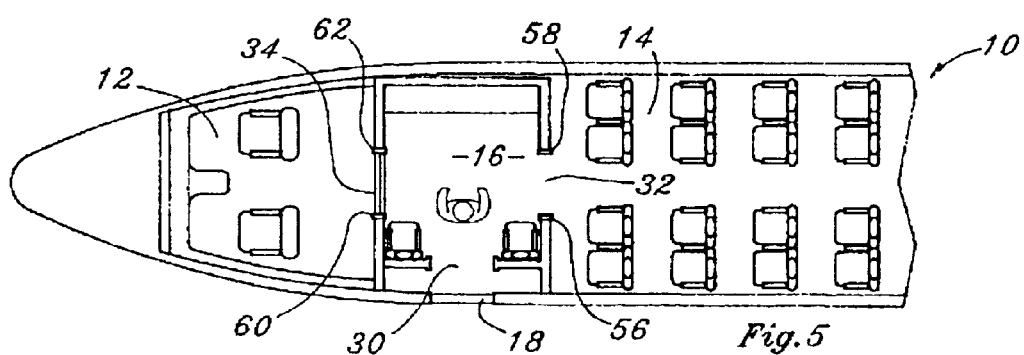
FIG. 5 is a simplified schematic partial plan view of the aircraft of FIG. 2 during norm al flight, with flight crew access.

FIG. 5 illustrates the second security condition during normal flight with flight attendant access to passenger area 14. Sensors 56–62 are armed. Entry door 30 is shown open, but may either be open or closed. Pilot door 34 is closed and locked. Flight attendants may pass freely through door 32 to attend to service functions for the passengers. Their passage is detected and is authorized by tags on their persons as they pass between sensors 56, 58.

Figure 6:
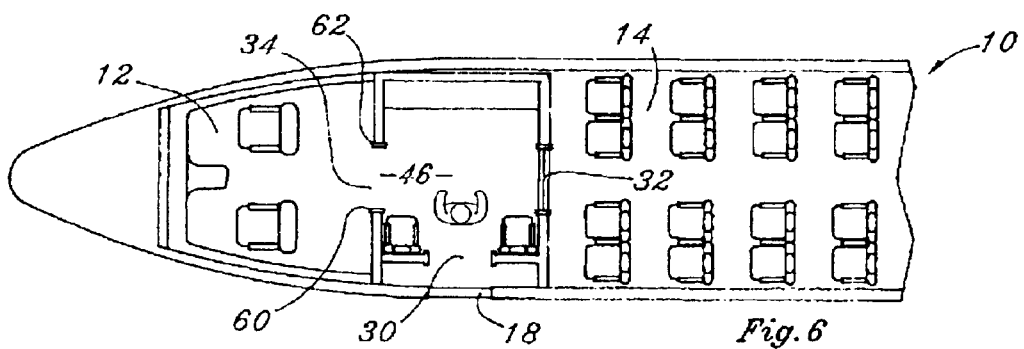
FIG. 6 is a simplified schematic partial plan view of the aircraft of FIG. 2 during normal flight with pilot access.

FIG. 6 illustrates another normal flight security condition, where the pilot wishes to enter security chamber 16. In this case, a door interlock system (to be described) prevents the opening of door 34, unless passenger door 32 is closed and locked. Passage of the pilots is detected and is authorized by tags on their persons as they pass between sensors 60, 62.

Lastly, FIG. 7 illustrates the unauthorized entry of a person, other than flight crew, into security chamber 16. The logic system (FIG. 7) is programmed such that passage of a person, without accompanying verification of an identification tag, is flagged. A security alarm signal is sent to the control system, whereupon all three doors are closed and locked by the door closing mechanisms 46 (FIG. 3), thereby confining the unauthorized person in security chamber 76. Since the walls are bullet-proof and since no vital operating systems are located in chamber 76, the detained passenger can harm neither pilots nor passengers.

FIG. 8 of the drawing shows a logic and door interlock control system 64 in simplified block diagram form. Logic block 66 consists of a suitably programmed minicomputer with a power supply 68 having an output directed to a door interlock control 70. Door interlock control 70 is arranged to lock and unlock entry door 30, passenger door 32 and pilot door 34 through remote actuators 72, 74, 76 respectively, and to actuate door closing mechanisms 46. The open or closed positions of the outer aircraft boarding door 78, entry door 30, passenger door 32, cockpit door 34 are detected by position sensors 78, 80, 82, 84 respectively. Detection of passage through passenger door 32 and verification of identity through passenger door 32 are sensed by detection blocks 86, 88 respectively. Similarly, the passage of a person through cockpit door 34 and verification of identity of the person passing through cockpit door 34 are sensed by cockpit entry detection block 90 and cockpit identification verification block 92 respectively. Signals from the sensors and detectors 78–92 are converted to suitable logic signals and applied to the program in computer logic 66 to operate the door interlock control 70 in a prescribed manner, such programming techniques being known to those skilled in the art.

Operation

The computer is programmed to provide the security conditions illustrated in FIGS. 4–7 according to the following table. X is an either/or condition.

| STATUS | AIRCRAFT DOOR | ENTRY DOOR | PASSENGER DOOR | COCKPIT DOOR |
| --- | --- | --- | --- | --- |
| Boarding | open | open | open | X |
| Normal Flight (Flight Attendant Access) | closed | X | open | locked |
| Normal Flight (Pilot Access) | closed | X | locked | open |
| Unauthorized Entry | closed | closed and locked | closed and locked | closed and locked |

During boarding, all doors are open including the door to the aircraft itself. The cockpit door may be either open or closed, as indicated by the X in the table. During normal flight, the aircraft outer door is closed, and the security chamber entry door may be either open or closed as indicated by an X in the table. The cockpit door is shown closed and must be locked whenever the passenger door is open. This permits flight attendant access to chamber 16. In the third condition of normal flight, the aircraft outer door is closed and entry door may be either opened or closed. The passenger door is shown closed and must be locked whenever the cockpit door is open.

Lastly, unauthorized entry requires that all three doors to the security chamber are immediately automatically closed and locked. This serves to confine an unauthorized person in security chamber 16. The chamber walls are bullet-proof to protect flight crew and passengers, and only non-essential equipment is located in security chamber 16.

Actuation of security condition for unauthorized entry may take place either when a person enters through the passenger door without an identification tag, or when any member of the flight crew determines that an unauthorized person is in the chamber. In the latter case, the override door close and lock system can be actuated by the override control.

Modification

Figure 9:
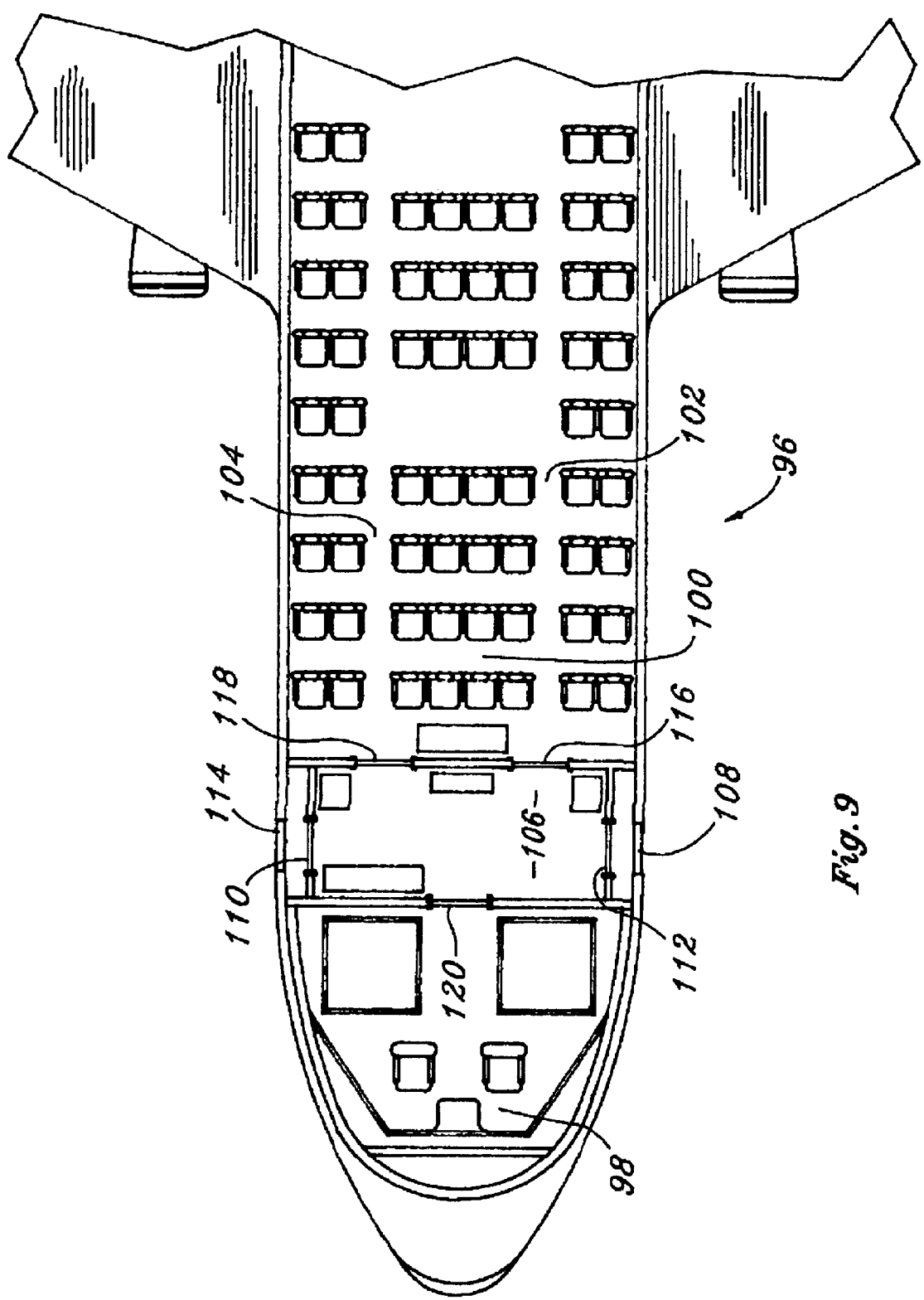
FIG. 9 is a simplified schematic partial plan view of a modification of the invention used in a double aisle large passenger aircraft.

While FIGS. 1–8 illustrate the aircraft security system for a smaller aircraft, FIG. 9 shows a modification of the invention adapted to a wide bodied aircraft, shown generally at 96. This aircraft includes a cockpit area 98 and a passenger area 100 with two main aisles 102, 104. A security chamber 106 is interposed between and provides the only passage between cockpit area 98 and passenger area 100. Aircraft 96 has outer boarding doors 108, 110 on either side. The security chamber 106, which is constructed as before, includes two entry doors 112, 114 opposite the respective outer boarding doors 108, 110. Passenger doors 116, 118 service the respective main aisles 102, 104. A single cockpit door 120 provides pilot access to the security chamber 106. Sensors (not shown) are provided as before on all doors. The fast closing door 36 shown in FIG. 3would be used for all of the doors 110, 112, 116, 118, 120.

Security chamber 106 is constructed as before with bullet-proof walls, floor and ceiling and bullet-proof doors. Preferably transparent panels of bullet-proof glass or plastic are provided to allow flight crew to observe unauthorized activity.

Modification

Figure 10:
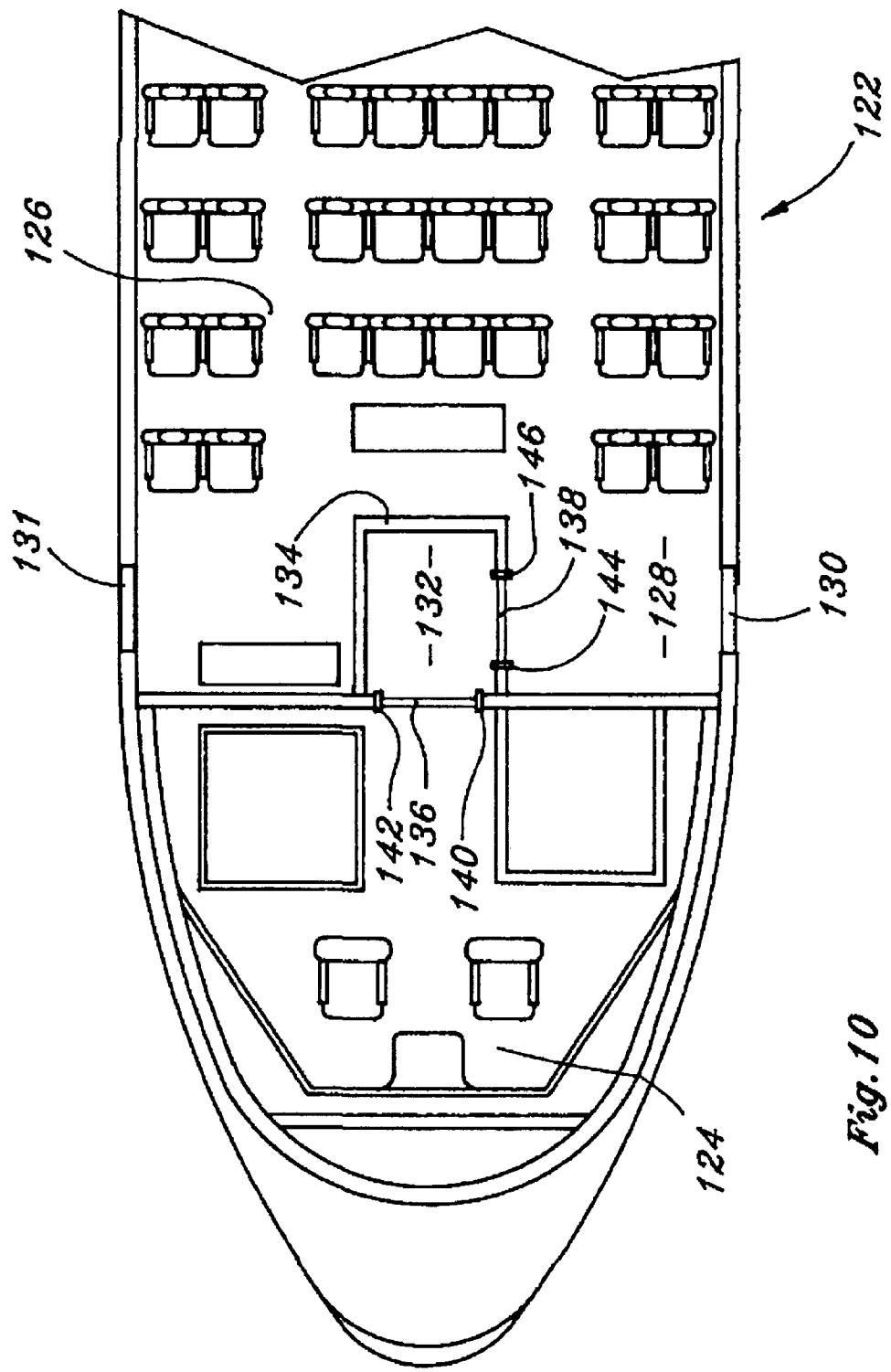
FIG. 10 is a further simplified schematic partial plan view o f a passenger aircraft with a two-door security chamber.

A further modification is shown n FIG. 10, wherein the security chamber has only two doors, and serves only as a passageway between cockpit area and passenger area, rather than doubling as a flight crew workspace. A wide bodied aircraft 122 includes a cockpit area 124 and passenger area 126. The cockpit area adjoins flight crew service area 128. Entry into the aircraft during boarding is by way of outer boarding doors 130 and 131.

A security chamber 132 is interposed between, and provides the only means of passage between, cockpit area 124 and passenger area 126. Security chamber 132 has bullet-proof, transparent walls 134, a bullet-proof cockpit door 136, and a bullet-proof passenger door 138. Cockpit door 136 is equipped with sensors 140, 142 and passenger door 138 is equipped with sensors 144, 146, operating as previously described. Doors 136, 138 also have automatic rapid door closing systems and are controlled by a logic system and door interlock system as previously described in FIGS. 3 and 8.

When the boarding door 130 is open, the sensors are not armed and either of the doors 136, 138 may either be open or closed.

The door interlock system is arranged so that when the outer boarding door 730 is closed, the interlock system prevents opening both the cockpit door 136 and the passenger door 138 at the same time. Authorized personnel may pass through security chamber 132 by separately opening and closing doors. A pilot may enter chamber 132 and view the area through transparent walls 134. However, entry of an unauthorized person into security chamber 132 through an open door causes the door to close and lock. The interlock system does not permit opening the other door, thereby detaining the unauthorized person inside a bullet-proof enclosure.

Industrial Applicability

The bullet-proof security chamber interposed between the cockpit area and the passenger area satisfies a pressing need to protect the security of an aircraft and its passengers and crew in flight, and to detain a would-be skyjacker. The door interlock system and sensors detecting an unauthorized entry during flight permit the flight crew to carry out its normal duties and impose no restrictions on safe passenger activities.

While there has been described what is considered to be the preferred embodiment of the invention and a modification thereof, it is desired to secure in the appended claims all such modifications as fall within the true spirit and scope of the invention.

What is claimed is:

1. A security system for monitoring and protecting flight crew in an aircraft carrying passengers, said flight crew being authorized persons fitted with electronic identification tags and said aircraft having a cockpit area, a passenger area, and an outer boarding door, said security system comprising:

a security chamber having bullet-proof walls interposed between, and providing the only passage between, the cockpit area and the passenger area, said chamber having at least two bullet-proof doors comprising a cockpit door opening into the cockpit area and a passenger door, a plurality of sensors adapted to detect passage of unauthorized persons into said security chamber, and an automated door interlock system responsive to said sensors and arranged to prevent opening both the cockpit door and the passenger door at the same time when the outer boarding door is closed.

2. The security system according to claim 1, and further including an entry door into said security chamber, said entry door being disposed adjacent the outer boarding door for boarding passengers through the security chamber.

3. The security system according to claim 1, wherein said sensors are adapted to detect passage of an unauthorized person through the passenger door, and logic means responsive to said sensors and arranged to cause said automated door interlock system to close and lock all of said doors when said sensors detect passage of an unauthorized person into the security chamber.

4. The security system according to claim 1, and further including a flight crew override arranged to cause said automated door interlock system to close and lock all of said doors when a flight crew member actuates said flight crew override.

5. The security system according to claim 1, wherein said sensors are adapted to detect passage of an unauthorized person through either the passenger door or through the pilot door, and logic means responsive to said sensors and arranged to cause said automated door interlock system to close and lock all of said doors when sensors detect passage of an unauthorized person into the security chamber.

6. The security system of claim 1, wherein at least one of said sensors includes an identification verification sensor responsive to said electronic identification tags.

7. The security system of claim 1, wherein at least one of said sensors includes an entry detection sensor responsive to passage of a person through one of said doors.

8. The security system according to claim 1, wherein the bullet-proof walls are, at least in part, transparent.

9. The security system according to claim 1, and further including a door closing mechanism responsive to said automated door interlock system operatively connected to each of said doors and arranged to close said doors to detain a person therein when actuated by the door interlock system.

* * * * *

UNITED STATES PATENT AND TRADEMARK OFFICE
CERTIFICATE OF CORRECTION

PATENT NO.   : 6,474,599 B1                                                     Page 1 of 1
DATED        : November 5, 2002
INVENTOR(S)  : Stomski, Gerald D.

Figure 1:
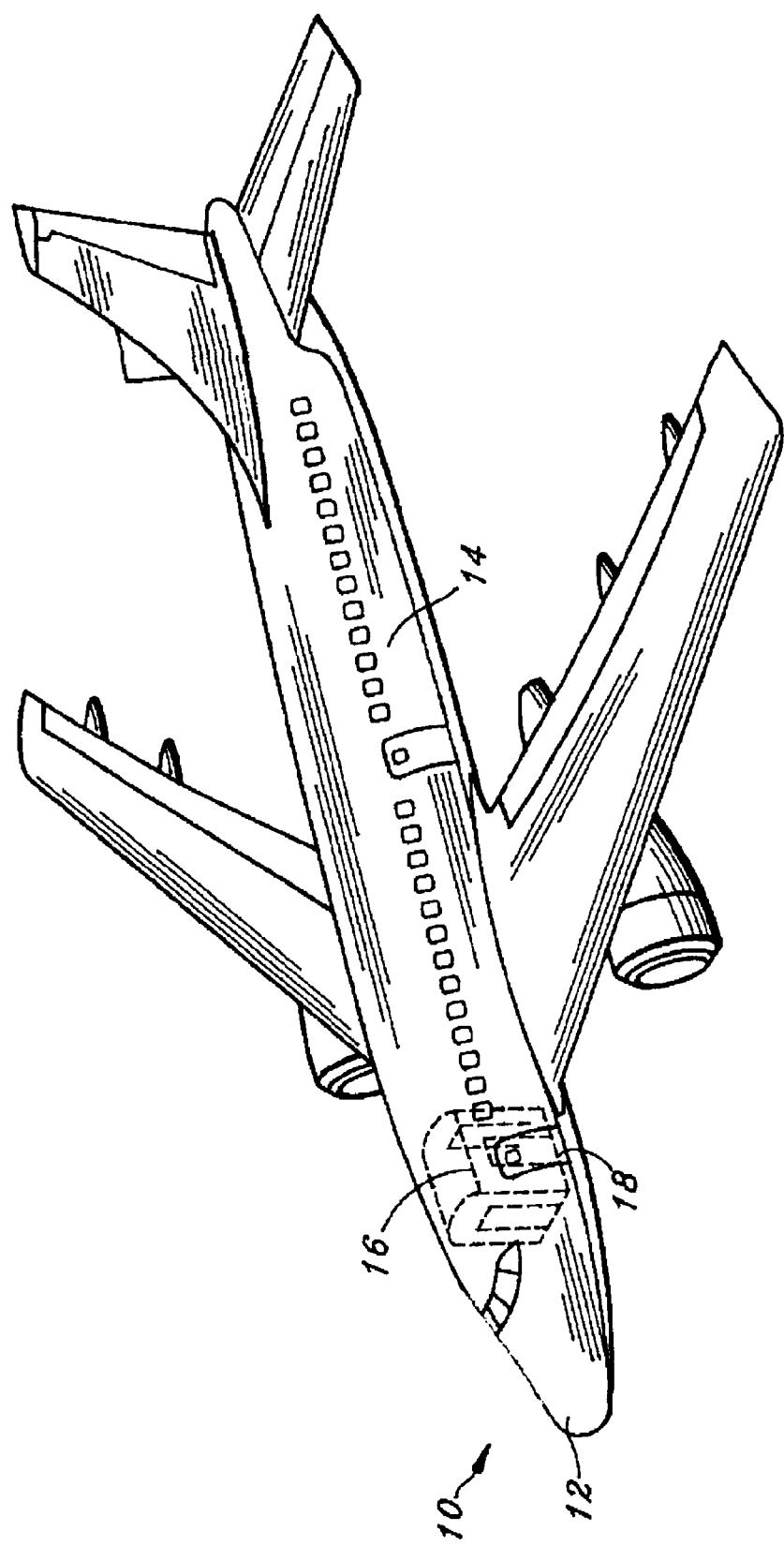
FIG. 1 is a perspective view of a passenger aircraft.

It is certified that error appears in the above-identified patent and that said Letters Patent is hereby corrected as shown below:

Column 2,
Line 26, cancel "Fig. 7" and substitute -- Fig. 1 --;
Line 29, cancel "74" and substitute -- 14 --;
Line 31, cancel "76" and substitute -- 16 --;
Line 32, cancel "76" and substitute -- 16 --;
Line 39, cancel "are a" and substitute -- area --;
Lines 42-43, cancel "passengers eats" and substitute -- passenger seats --.

Column 4,
Line 1, cancel "76" and substitute -- 16 --;
Line 3, cancel "76" and substitute -- 16 --;
Line 13, cancel "78" and substitute -- 18 --.

Column 5,
Line 53, cancel "730" and substitute -- 130 --.

Signed and Sealed this

Third Day of June, 2003

JAMES E. ROGAN
*Director of the United States Patent and Trademark Office*